United States Patent [19]

Pocholle et al.

[11] Patent Number: 4,917,450
[45] Date of Patent: Apr. 17, 1990

[54] DYNAMIC OPTICAL INTERCONNECTION DEVICE FOR INTEGRATED CIRCUITS

[75] Inventors: Jean P. Pocholle, Arpajon; Bourbin Yannic, Antony; Michel Papuchon, Massy; Pierre J. Huignard, Paris; Claude Puech, Longjumeau, all of France

[73] Assignee: Thomson-CSF, Paris, France

[21] Appl. No.: 264,396

[22] Filed: Oct. 31, 1988

[30] Foreign Application Priority Data

Nov. 3, 1987 [FR] France ................ 87 15200

[51] Int. Cl.⁴ .............. G02B 6/12; G02F 1/29
[52] U.S. Cl. .............. 350/96.11; 250/96.13; 250/96.14; 250/96.19
[58] Field of Search .......... 350/96.11, 96.15

[56] References Cited

U.S. PATENT DOCUMENTS

| | | | |
|---|---|---|---|
| 4,007,978 | 2/1977 | Holton | 350/96.11 |
| 4,146,297 | 3/1979 | Alferness et al. | 350/96.14 |
| 4,468,084 | 8/1984 | Hutcheson et al. | 350/96.11 |
| 4,718,052 | 1/1988 | Kondo et al. | 350/96.11 X |

OTHER PUBLICATIONS

IEEE Journal of Quantum Electronics, vol. QE-20, No. 4, Apr. 1984, pp. 332-334; N. A. Olsson et al.
Electronics Letters, vol. 19, No. 23, Nov. 1983, pp. 1002-1003; I. Suemune et al.
Journal of Lightwave Technology, vol. LT-4, No. 7, Jul. 1986, pp. 913-917; S. Ura et al.
Patent Abstracts of Japan, vol. 10, No. 41 (P-429) [2098], Feb. 18, 1986.
Patent Abstracts of Japan, vol. 6, No. 41 (P-106) [919], Mar. 13, 1982.
Patent Abstracts of Japan, vol. 9, No. 276 (P-402) [1999], Nov. 2, 1985.

*Primary Examiner*—John D. Lee
*Assistant Examiner*—Phan T. Heartney
*Attorney, Agent, or Firm*—Oblon, Spivak, McClelland, Maier & Neustadt

[57] ABSTRACT

An embodiment of the disclosed device includes: two coupled laser diodes, emitting a light wave which is modulated in frequency and amplitude by electrical signals which control the selection of one among several interconnections and represent a sequence of binary data also included is an optical guide embedded in the surface of a semiconductor substrate and a diffraction grating etched on the surface of the guide and substrate, coupled to the guide to diffract the light in several directions depending on the wavelength as well as photodiodes respectively located in one of the directions where the light can be diffracted, to give an electrical signal representing the binary data transmitted in the direction corresponding to the photodiode. In other embodiments, the photodiodes are coupled to laser diodes by means of a holographic grating.

9 Claims, 6 Drawing Sheets

DYNAMIC OPTICAL INTERCONNECTION DEVICE FOR INTEGRATED CIRCUITS

BACKGROUND OF THE INVENTION

1. Field of the Invention

The invention concerns a dynamic optical interconnection device for integrated circuits which can be used to make temporally variable interconnections among several chips bearing integrated circuits, to enable them to exchange data.

2. Description of the Prior Art

Prior art methods exist for making static interconnections among integrated circuits using discrete or integrated optical components such as lenses, holographic gratings, optic guides, optic fibers, etc.

The aim of the invention is to enable a modification of interconnections over a period of time, to enable, for example:

sequential or parallel access to several electronic circuits;

a possibility of redundancy in the processing of signals by switching over, within a circuit or set of circuits, to set right the malfunctioning of a component;

the performance of parallel processing;

a temporal and spatial reconfiguration of the architecture of a system, in modifying the interconnections among the circuits forming the system.

SUMMARY OF THE INVENTION

An object of the invention is a device used to connect an integrated circuit to another integrated circuit, selected from among several such circuits, by means of a light beam diffracted in a direction, chosen among several pre-defined directions, as a function of an electrical control signal. This device notably has the advantage of being capable of integration in an integrated circuit on a silicon chip.

According to the invention, a dynamic optical interconnection device for integrated circuits including:

at least one device for emitting coherent light, modulated in frequency and in amplitude depending on electrical signals selecting one among several interconnections and representing a sequence of data;

at least one optical guide coupled to the emitting device;

at least one diffraction grating coupled to the guide to diffract the light emitted by the emitting device in a direction depending on the frequency of this light;

each emitting device, each optical guide and each diffraction grating being integrated in one and the same integrated circuit semiconductor substrate;

and including:

several photoelectrical receivers coupled to the diffraction grating so as to receive the light diffracted respectively in several pre-defined directions corresponding to several interconnections, each receiver giving an electrical signal according to the amplitude of the light diffracted in the corresponding direction, when this interconnection is selected.

DESCRIPTION OF PREFERRED EMBODIMENTS

Figure 1:
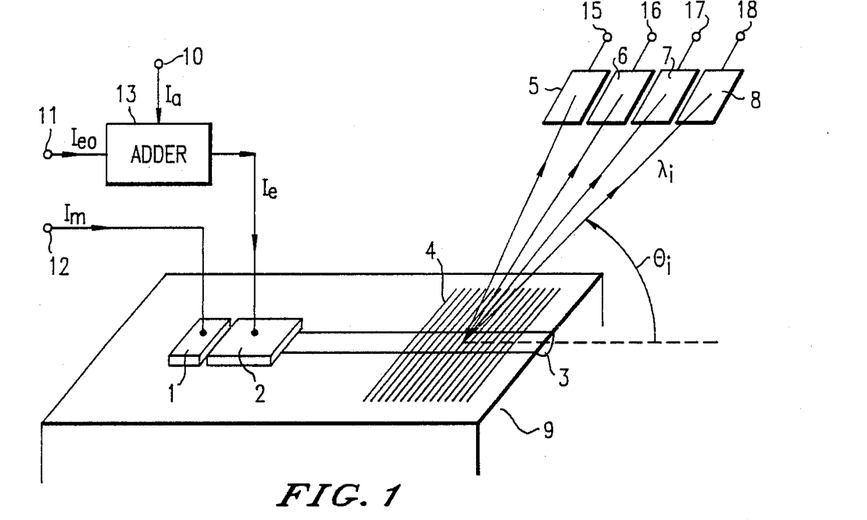
FIG. 1 shows a schematic view of an embodiment of a device according to the invention.

FIG. 1 shows a schematic view of a first embodiment of the device according to the invention, comprising: two laser diodes 1 and 2, coupled to form a device emitting coherent light, capable of modulation in intensity and in frequency; an optical guide 3, coupled to an output of the laser diode 2 and embedded in the surface of a semiconductor substrate 9, also supporting the laser diodes 1 and 2; a diffraction grating 4 coupled to the guide 3, the lines of this guide 4 being or capable of being etched perpendicularly to the big axis of the guide 3 on the surface common to the guide 3 and to the substrate 9; an input terminal 12 connected to the laser diode 1 to supply it with it a current having an intensity $I_m$; two input terminals 10 and 11, respectively connected to two inputs of an analog adder 13 with one of its outputs connected to the laser diode 2 to give it a current with an intensity $I_e$; said current being the sum of two currents respectively applied to the two input terminals 10 and 11, and having intensities of $I_d$ and $I_{eo}$ respectively; four photodiodes, 5 to 8, located in a plane parallel to the surface of the substrate g, above this substrate and respectively connected to four output terminals 15 to 18.

The coupled laser diodes, 1 and 2, emit coherent light, the intensity and frequency of which are a function of two intensities $I_m$ and $I_e$.

In this embodiment, the intensities $_{eo}$ an $I_m$ provide control over the frequency of the light; the intensity $I_d$ makes it possible to control the intensity of this light to transmit binary data. The grating deflects this light inside a plane which is perpendicular to the lines of the grating 4 and passes through the big axis of the guide 3 in an angle $\theta_i$, which is a function of the wavelength $\lambda_i$, of this light. In this example, the frequency of light may assume four values corresponding to four wavelengths $\lambda_i$, for $i=1$ to 4 and, consequently, the light is deflected in four directions $\theta_i$ with respect to the big axis of the guide 3.

The photodiodes 5 to 8 are placed so as to receive the light emitted respectively in the four directions $\theta_i$ for $i=1$ to 4. The photodiode which receives the light converts it into an electrical signal representing binary data and gives it to the output terminal corresponding to this photodiode. In this example, the photodiodes 5 to 8 are integrated in a chip with its plane parallel but not coplanar with the substrate 9

Figure 2:
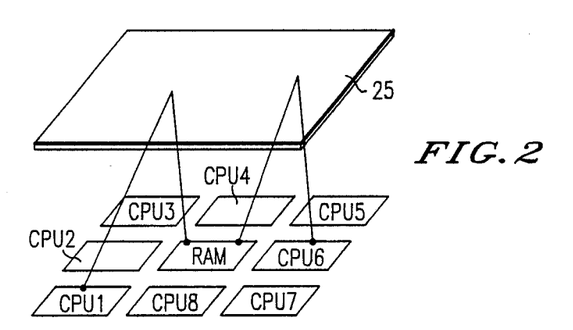
FIG. 2 shows an application of the device according to the invention.

In other embodiments, such as the one shown in FIG. 2, the two parts of the interconnection device are not located face to face but the same plane as the substrate 9. They are coupled by means of a holographic grating 25. In the example shown in FIG. 2, eight central processing units, marked CPU1 to CP8, and a memory marked RAM are located in one and the same plane and are interconnected by means of devices according to the invention, through a holographic grating 25 located in a plane parallel to the plane containing these integrated circuits.

For example, the central processing unit 1 may communicate with the memory RAM by means of a data emitter/receiver 21, formed by elements similar to those shown in FIG. 1 and located on the chip of CPU1. Similarly, the data emitter/receiver 22, located in the RAM, has elements similar to those shown in FIG. 1 and located on the RAM chip.

The laser diodes 1 and 2 and the guide 3 are made of a semiconductor alloy GaAs or GaAlAs. This type of alloy can be integrated, by a known technique, with a silicon substrate used in a standard way to make the integrated chips. The photodiodes can be made directly in a silicon substrate. The wavelengths used are in a spectral range of 0.8 to 0.9 microns.

Figure 3:
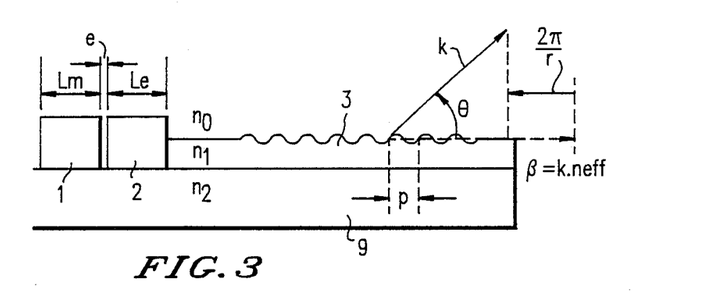
FIG. 3 shows a sectional view of an embodiment shown in FIG. 1.

FIG. 3 gives a schematic view of a coherent light emitting device formed by laser diodes 1 and 2, coupled to the guide 3. They are made in a standard manner. Their respective lengths are $L_n$ and $L_e$ and they have a gap between them with a width e. The material forming the guide 3 has an index $n_1$ and the material forming the substrate 9 has an index $n_2$. However, the effective index in the guide 3 has a value $n_{eff}$ ranging between $n_1$ and $n_2$. The longitudinal propagation constant associated with the guided mode in the guide 3 is marked $\beta$ and is equal to $k.n_{eff}$ where $k=2\pi/\lambda$. The pitch of the grating is marked P. The grating diffracts the major part of the energy of the wave in a single direction $\theta$, measured with respect to the plane of the grating.

As shown in FIG. 3, the conservation of the longitudinal component of the field requires the following relationship to be met:

$$\beta - \frac{2\pi}{P} = k \cdot \cos\theta \tag{1}$$

This equation can also be put in the following form:

$$n_{eff} - \frac{\lambda}{P} = \cos\theta \tag{2}$$

If the wavelength varies by $\Delta\lambda$, the angle $\theta$ varies by $\Delta\theta$ according to the formula:

$$\frac{\Delta\theta}{\Delta\lambda} = \frac{1}{\sin\theta} \cdot \left( \frac{1}{P} - \frac{dn_{eff}}{d\lambda} \right) \tag{3}$$

The angle variation is therefore all the greater as $\sin\theta$ is low and as the ratio $$\frac{dn_{eff}}{d\lambda}$$

is great, i.e. for a wavelength corresponding to the neighborhood of the forbidden gap of the material forming the guide. Furthermore, by a judicious choice of the thickness of the guide and the difference in index, $n_1-n_2$, the angle variation can be increased for a given variation in the wavelength. It is also possible to optimize the variation $$\frac{dn_{eff}}{d\lambda}.$$

of the effective index according to the variation in the wavelength.

The guide 3 consists of a semiconductor material to enable its integration in an integrated circuit chip. In this case, the angular divergence of the deflected beam is given by the formula:

$$\delta\theta = \frac{\lambda}{L_{eff} \cdot \sin\theta} \tag{4}$$

by which $L_{eff}$ is the effective length of interaction between the light and the grating, taking into account losses. The maximum N of directions $\theta_i$ which can be resolved spatially is then given by the following formula:

$$N = \frac{\Delta\theta}{\delta\theta} = \left( -\frac{dn_{eff}}{d\lambda} + \frac{1}{P} \right) - \frac{\Delta\lambda}{\lambda} \cdot L_{eff} \tag{5}$$

where $\Delta\lambda$ the wavelength deviation which can be achieved with the coherent light emitting device used.

Figure 4A:
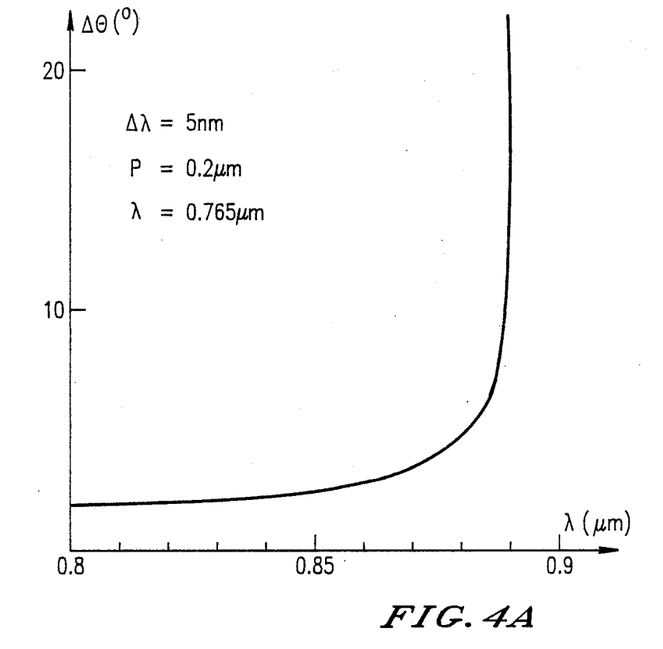
FIGS. 4a and 4b show graphs illustrating the performance characteristics of an exemplary embodiment of the device according to the invention.
Figure 4B:
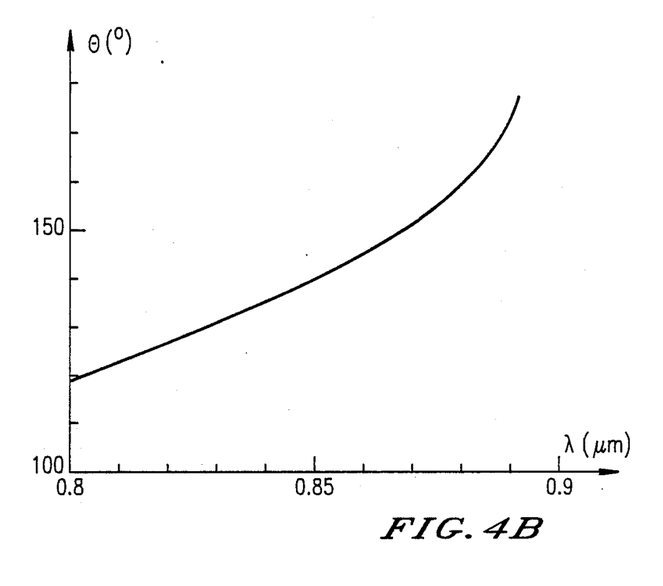

FIGS. 4a and 4b show graphs illustrating the operation of the device according to the invention in an embodiment where the guide is made of $Ga_{0.85}Al_{0.15}As$ and where the substrate 9 is made of $Ga_{0.72}Al_{0.18}As$; where P=0.2 microns and where the transparence limit wavelength $\lambda g$ is equal to 0.765 microns, in the material of the guide.

FIG. 4a shows the variation $\Delta\theta$ of the deviation angle for a variation $\Delta\lambda=5$.nm in the wavelength, around a fixed wavelength in the range of 0.8 to 0.89 microns. It would appear that the deviation may exceed 20 degrees in the neighborhood of the 0.89 micron wavelength.

FIG. 4b shows the angle of deflection $\theta$ as a function of the wavelength in the 0.8–0.89 micron range. It would appear that the deflection varies by about 69 degrees in this range.

The laser diode 2 is said to be enslaved and is driven by a current with an intensity $I_e$ which is the sum of a continuous component and a variable component such that the sum is greater than the threshold value $I_{s1}$ needed to trigger a light emission. The laser diode 1 is said to be a master diode and is driven by a current with an intensity $I_m$ which is the sum of a continuous component and a variable component such that this sum remains below the threshold value $I_{s1}$ in all cases.

When the two variable components with intensities $I_e$ and $I_m$ are null, there is no light emission. When the value of the intensity $I_e$ is greater than the threshold value $I_{s1}$, there is a light emission, the wavelength of which may be controlled by the value of the variable component with the intensity $I_m$. When this variable component increases in terms of absolute value, the emission wavelength diminishes and the light intensity increases. The frequency deviation is defined by the lengths $L_e$ and $L_m$ of the cavities of the laser diodes and by the values of the intensities $I_e$ and $I_m$. The frequency interval of the longitudinal modes of the cavities of the two laser diodes is given, respectively, by the following formulae:

$$\Delta\lambda_e = \frac{\lambda_o^2}{2N_e \cdot L_e} \tag{6}$$

$$\Delta\lambda_m = \frac{\lambda_o^2}{2N_m \cdot L_m} \quad (7)$$

where $N_e$ and $N_m$ respectively represent the effective optical indices of each of the cavities, and where $\lambda_o$ is the mean wavelength of the light emission. The coupled modes between these two cavities correspond to those for which a constructive interference is achieved. This corresponds to a new modal spectrum in which the interval between adjacent modes is given by the following formula.

$$\Delta\lambda_{e \cdot m} = \frac{\lambda_o^2}{2(N_e \cdot L_e - N_m \cdot L_m)} \quad (8)$$

The interval got is far greater than that existing between the longitudinal modes of each cavity. Furthermore, this type of source also has the property of conserving the monomodal longitudinal character.

The two coupled laser diodes may further play the role of a combinational logic circuit for the intensities $I_e$ and $I_m$. The making of OR, AND or exclusive OR logic functions by means of two coupled laser diodes is known from W. T. TSANG, M. A. OLSSON, R. A. LOGAN in "Opto-Electronic Logic Operation by Cleaved Coupled Cavity Semiconductor Lasers", IEEE Journ. of Quant. Elect. Q.E.-19, Nov. 1983, p. 1621.

Furthermore, the making of a bistable logic device by means of two coupled laser diodes is known from M. A. OLSSON, W. T. TSANG, R. A. LOGAN, I. P. KAMINOW, and J. S. KO in "Spectral Bistability in Coupled Cavity Semiconductor Lasers", Appl. Phys. Lett., 44 (4), Feb. 15, 1984, p. 375. This device enables the use of two control signals formed by of fugitive impulses.

FIGS. 5 to 8 represent timing diagrams that illustrate the making of an exemplary logic function. In these timing diagrams, each of the intensities $I_e$ and $I_m$ can assume only two values, one called a high value and the other called a low value. In this exemplary embodiment, the two coupled diodes, emit on a wavelength $\lambda_1$ if $I_e$ or $I_m$ alone assumes its high value. They emit on a wavelength $\lambda_2$ if $I_e$ and $I_m$ simultaneously assume their high value. And they emit no light if $I_e$ and $I_m$ simultaneously assume their low values.

Figure 5:
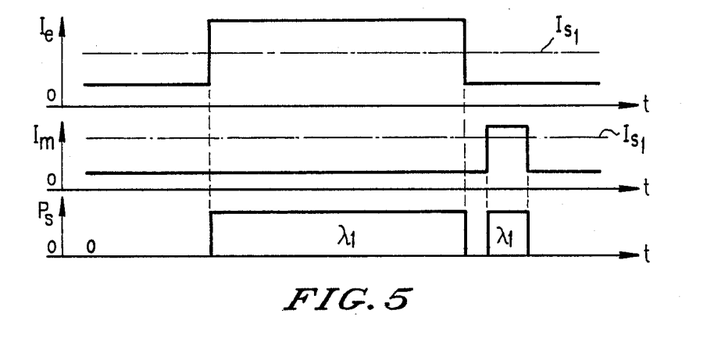
FIGS. 5 to 10 show timing diagrams of control signals of this exemplary embodiment.

FIG. 5 shows that the emitted luminous power $P_s$ is null when the intensities $I_e$ and $I_m$ are respectively equal to their low values which are continuous components far below the threshold value $I_{s1}$. When the intensity $I_e$ assumes its high value, which is greater than the threshold value, while the intensity $I_m$ remains equal to its low value, a light beam is emitted with a wavelength $\lambda_1$. Similarly when $I_e$ is equal to its low value, while $I_m$ assumes its high value, which is below the threshold value but far greater than its low value, a light wave with a wavelength $\lambda_1$ is emitted.

Figure 6:
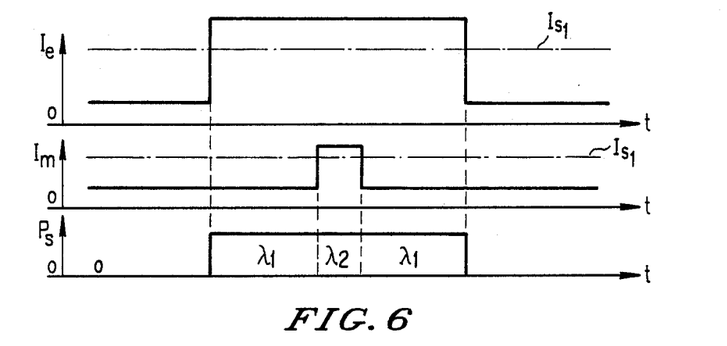

FIG. 6 illustrates an example where the intensity $I_e$ assumes its high value for a time interval during which the intensity $I_m$ also assumes its high value but does so for a smaller period. During the time interval when the two intensities $I_e$ and $I_m$ simultaneously assume their high value, the wavelength assumes a value $\lambda_2$ whereas, during the time intervals when the intensity $I_e$ is alone in assuming its high value, the wavelength remains equal to $\lambda_1$.

Figure 7:
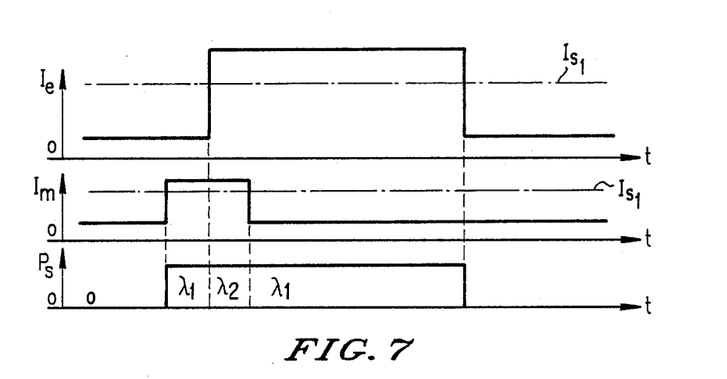

FIG. 7 illustrates an example where the intensity $I_e$ assumes its high value at an instant located during an interval where the intensity $I_m$ has its high value. When the intensity $I_m$ assumes its high value while the intensity $I_e$ is equal to its low value, a light wave is emitted with a wavelength $\lambda_1$. Then, during the interval when the two intensities $I_e$ and $I_m$ respectively assume their high values, the wavelength goes to the value $\lambda_2$. Then, when the intensity $I_e$ is alone in keeping its high value, the wavelength again goes to the value $\lambda_1$. Finally, when the two intensities $\lambda_e$ and $\lambda_n$ have their low value, the light emission stops.

Figure 8:
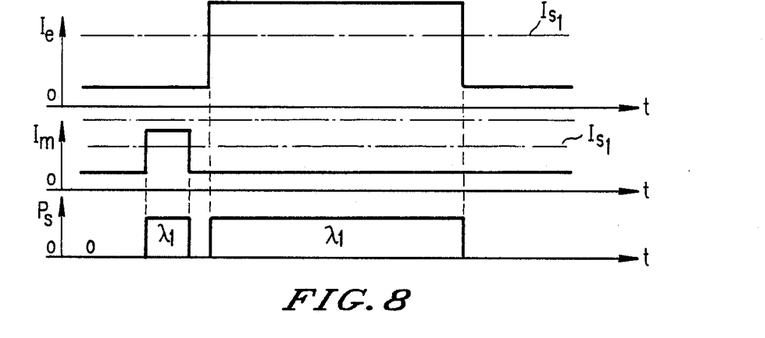

FIG. 8 shows a case where the intensity $I_m$ assumes its high value for a time interval where the intensity $I_e$ remains equal to its low value, the wavelength of the light emitted being then equal to and where, subsequently, the intensity $I_e$ assumes its high value for a time interval where the intensity $I_m$ remains at its low value, the wavelength of the light emitted being again equal to $\lambda_1$. During the period between these two intervals, the intensities $I_e$ and $I_m$ remain at their low values and no light is emitted.

Figure 9:
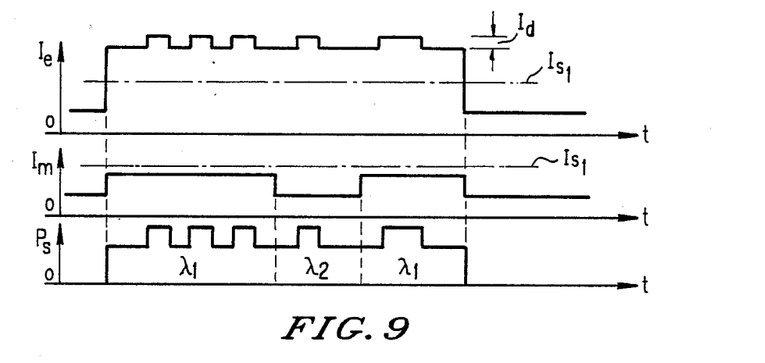
Figure 10:
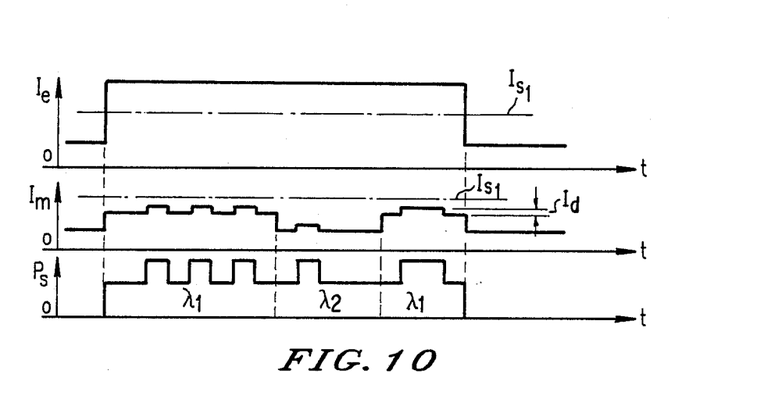

The transmission of data by the emitted light may be achieved by modulating either the intensity $I_m$ or the intensity $I_e$, in adding an electrical signal to this emitted light, said electrical signal having an intensity $I_d$ with a low amplitude as compared to the high value of the intensity to be modulated. FIGS. 9 and 10 illustrate these two possible alternatives.

In FIG. 9, the intensity $I_m$ successively assumes its high value, then its low value, then its high value while the intensity $I_e$ assumes its high value, modulated by the data signal with an intensity $I_d$, to successively emit this data in modulating the amplitude of a light with a wavelength $\lambda_1$, then $\lambda_2$ and then $\lambda_3$ respectively.

In FIG. 10, the intensity $I_m$ successively assumes its high value, then its low value, then its high value, in being modulated by the intensity $I_d$ of the data signal while the intensity $I_e$ continuously assumes its high value. The intensity $I_d$ has a value such that the sum $I_m + I_e$ remains smaller than the threshold value $I_{sl}$. As in the first case, the wavelength of the light emitted successively assumes the values $\lambda_1, \lambda_2 \lambda_1$.

Figure 11:
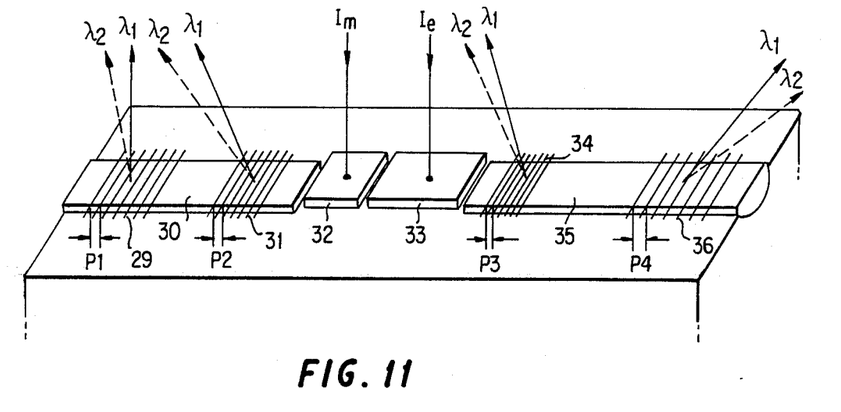
FIGS. 11 to 14 show four alternative embodiments of the device according to the invention.

FIGS. 11 to 14 represent various alternative embodiments of the device according to the invention, enabling a great increase in the number of interconnections made from a given point. FIG. 11 shows an alternative comprising two coupled laser diodes, 32 and 33: two optical guides 30 and 35, respectively coupled to an output of the laser diode 32 and an output of the laser diode 33, the two guides being aligned. The guide 30 is coupled to two diffraction gratings, 2g and 31, with two different pitches P1 and P2. The guide 35 is coupled to two diffraction gratings 34 and 36 having two different pitches, P3 and P4 respectively, different from P1 and P2. For one and the same wavelength, the four diffraction gratings diffract light in four different directions.

Switching over from a wavelength $\lambda_1$ to a wavelength $\lambda_1$ to a wavelength $\lambda_2$ thus enables the making of a two-position change-over switch function on four circuits transmitting one and the same binary signal. The number of positions is not limited to two. It is quite possible to control the value of the intensities $I_m$ and $I_d$ to achieve a change-over switch in three or four directions, for example, for each grating.

Figure 12:
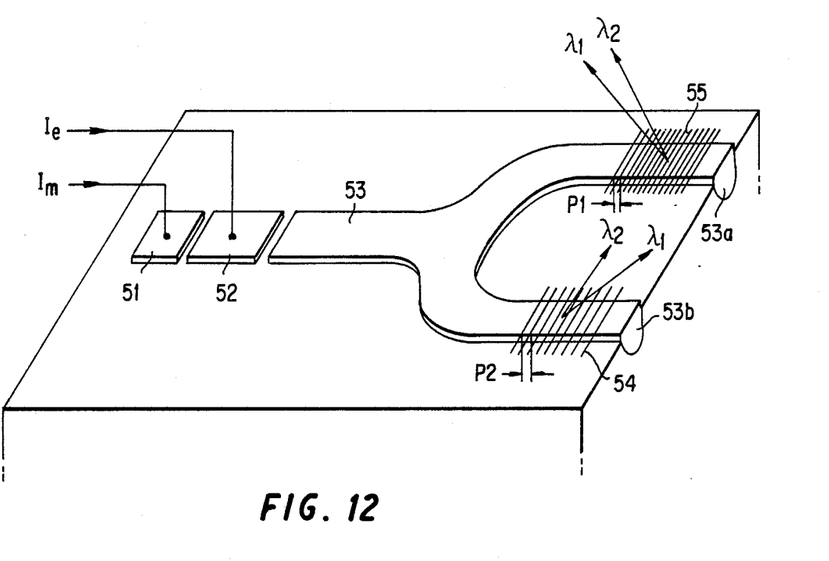

FIG. 12 shows another alternative embodiment comprising two coupled laser diodes 51 and 52; and a guide 53 which is coupled to an output of the laser diode 52 and is subdivided into two guides 53a and 53b, each having a direction parallel to the big axis of the guide 53. The guides 53a and 53b are respectively coupled to two gratings 54 and 55 having different pitches P1 and P2 respectively. For one and the same wavelength $\lambda_1$, this device emits a light wave along two different angles and thus enables the simultaneous setting up of two interconnections.

Figure 13:
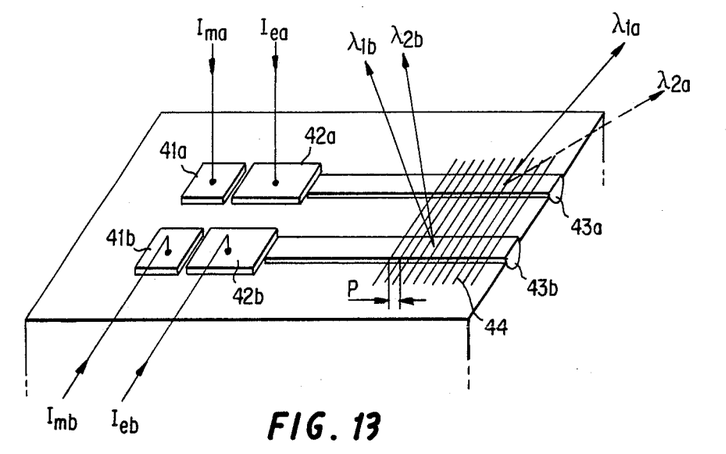

FIG. 3 shows another alternative embodiment comprising: two pairs of laser diodes 41a, 42a and 41b, 42b; two optical guides 43a and 43b respectively coupled to an output of the laser diodes 42a and 42b and having their big axes parallel to one another; a diffraction grating 44 is etched on the surface of the two guides 43a and 43b, perpendicularly to their big axes. The two pairs of laser diodes are respectively powered by currents with independent intensities, $I_{ma}$, $I_{ea}$ and $I_{mb}$, $I_{eb}$, to transmit two different sequences of binary data.

Each pair of laser diodes is controlled to emit on a wavelength chosen between two values: $\lambda_{1a}$ and $\lambda_{2a}$ for the laser diodes 41a and 42a; $\lambda_{1b}$ and $\lambda_b$ for the laser diodes 41b and 42b. Since the four wavelengths are different, the four directions of diffraction corresponding to these wavelengths are different. The device is therefore equivalent to a two-position two-circuit change-over switch. The value of the pitch P of the grating 44 is chosen, taking into account the wavelength values, so that the four directions of diffraction are as different as possible to make a clear separation between the two interconnections conveying different data.

Figure 14:
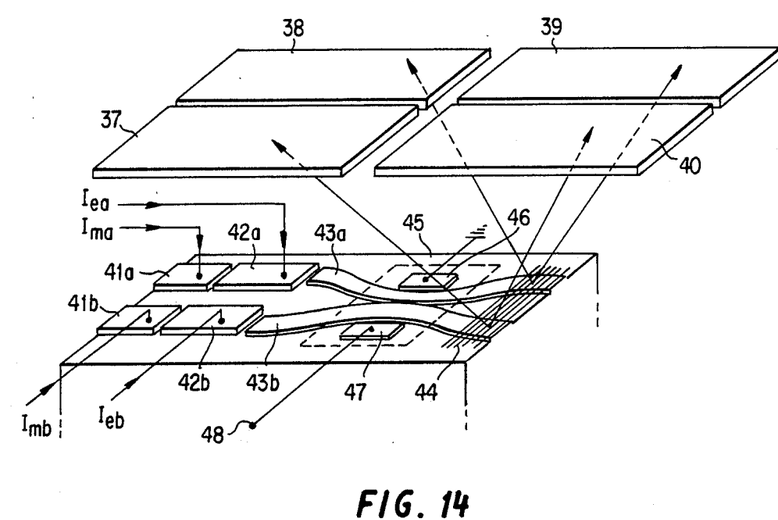

FIG. 14 shows another embodiment providing for a greater number of interconnections than the above alternative, through the use of a directional coupler 45 which enables the coupling of the guides 43a and 43b. These guides each have a section where they are very close to each other and where their optical properties are electrically controlled by means of two electrodes 46 and 47. The electrode 46 is connected to a reference potential and the electrode 47 is connected to an input terminal 48 enabling the application of an additional control signal which is a binary signal used to control the transfer of the light signal from the guide 43a towards the guide 43d, or conversely, depending on the This FIG. 14 shows the four photodiodes, 37 to 40, placed before the diffraction grating 44 to collect the light respectively emitted in two directions from the guide 43a and in two directions from the guide 43b. The directional coupler 45 enables the selection, by means of an electrical control, of the binary data transmitted by the wave of the pair of laser diodes 41a, 42a, or else the binary data transmitted by the wave of the pair of laser diodes 41b, 42b. The coupler 45 transmits the selected wave either to the end of the guide 43a or towards the end of the guide 43b, where it is diffracted in one of the four directions corresponding to the four photodiodes 37 to 40.

The invention is not restricted to the embodiments described above. A great many alternatives are within the scope of those skilled in the art, notably with respect to use of a passive directional coupler instead of the above-described active coupler. In this case, the coupling direction is determined by spectral filtering. The selection between two sequences of binary data is made by transmitting a selected wave along its wavelength. The selection is controlled by modifying the wavelength of the light emitted by the emitting devices 41a, 42a and 41b.

The number of directions of diffraction used is not limited to two. It is enough to use control currents capable of assuming a greater number of intensity values to obtain change-over switching functions in a greater number of directions.

The number of optical guides coupled to a pair of laser diodes is not limited to two. Prior art types of couplers enable the coupling of a greater number of optical guides to one and the same pair of laser diodes, and each optical guide may itself be coupled to several diffraction gratings.

Since the device according to the invention can be made with semiconductor materials, it may be integrated in electronic integrated circuit chips, especially in chips of very large-scale integrated circuits.

What is claimed is:

1. A dynamic optical interconnection device for integrated circuits, comprising:
   at least one device for emitting coherent light, frequency modulated by a first electrical signal selecting one of several interconnections and amplitude modulated by a second electrical signal representing a sequence of data;
   at least one optical guide coupled to the emitting device;
   at least one diffraction grafting coupled to the guide to diffract the light emitted by the emitting device in a direction depending on the frequency of this light;
   each emitting device, each optical guide and each diffraction grating being integrated in one and the same integrated circuit semiconductor substrate;
   and comprising:
   a plurality of photoelectrical receivers coupled to the diffraction grating so as to receive the light diffracted respectively in several pre-defined directions correspond to several interconnections, each receiver given an electrical signal indication according to the amplitude of the light diffracted in the corresponding direction, when this interconnection is selected.

2. A device according to claim 1, wherein the emitting device consists of two coupled semiconductor laser diodes.

3. A device according to claim 2, wherein the two laser diodes are respectively controlled by the intensity of a first current and a second current which may assume a large number of values corresponding to a large number of possible interconnections, the intensity of the second current being, furthermore, modulated in amplitude by the data.

4. A device according to claim 1, wherein several diffraction gratings are coupled to one and the same guide and respectively have different pitches.

5. A device according to claim 1 wherein several optical guides are coupled to one and the same emitting device and wherein at least one diffraction grating is coupled to each guide.

6. A device according to claim 1, wherein several guides are respectively coupled to several emitting devices and are coupled to one and the same diffraction grating.

7. A device according to claim 1, comprising several emitting devices coupled to several guides, and wherein the guides are coupled to each other by means of a directional coupler.

8. A device according to claim 7, wherein the directional coupler is a coupler with its direction controlled electrically.

9. A device according to claim 7, wherein the directional coupler is a coupler with spectral filtering, its direction being controlled by a change in the wavelength of the light emitted by the emitting devices.

* * * * *

UNITED STATES PATENT AND TRADEMARK OFFICE
CERTIFICATE OF CORRECTION

PATENT NO. : 4,917,450

DATED : APRIL 17, 1990

INVENTOR(S) : JEAN P. POCHOLLE ET AL.

It is certified that error appears in the above-identified patent and that said Letters Patent is hereby corrected as shown below:

On the title page:

In the inventors, delete "Pierre J. Huignard" and insert --Jean P. Huignard--.

Signed and Sealed this

Twenty-seventh Day of August, 1991

Attest:

HARRY F. MANBECK, JR.

Attesting Officer

Commissioner of Patents and Trademarks